United States Patent
Liu

(10) Patent No.: US 9,642,396 B2
(45) Date of Patent: May 9, 2017

(54) ELECTRONIC CIGARETTE SET, ELECTRONIC CIGARETTE AND BATTERY ASSEMBLY THEREOF

(71) Applicant: Qiuming Liu, Guangdong (CN)

(72) Inventor: Qiuming Liu, Guangdong (CN)

(73) Assignee: HUIZHOU KIMREE TECHNOLOGY CO., LTD. SHENZHEN BRANCH, Shenzhen, Guangdong (CN)

( * ) Notice: Subject to any disclaimer, the term of this patent is extended or adjusted under 35 U.S.C. 154(b) by 0 days.

(21) Appl. No.: 14/117,200

(22) PCT Filed: Sep. 5, 2013

(86) PCT No.: PCT/CN2013/082975
§ 371 (c)(1),
(2) Date: Nov. 12, 2013

(87) PCT Pub. No.: WO2015/021681
PCT Pub. Date: Feb. 19, 2015

(65) Prior Publication Data
US 2016/0286857 A1      Oct. 6, 2016

(30) Foreign Application Priority Data

Aug. 16, 2013   (CN) .................... 2013 2 0503567 U

(51) Int. Cl.
*A24F 47/00*   (2006.01)
*H01M 2/20*    (2006.01)
(Continued)

(52) U.S. Cl.
CPC ......... *A24F 47/008* (2013.01); *H01M 2/1022* (2013.01); *H01M 2/20* (2013.01);
(Continued)

(58) Field of Classification Search
CPC ..... A24F 47/008; H01M 2/1022; H01M 2/20; H01M 2220/30; H02J 7/0044; H02J 7/0063
See application file for complete search history.

(56) References Cited

U.S. PATENT DOCUMENTS 5,144,962 A * 9/1992 Counts ................. A24F 47/008
                                                    128/200.14
2011/0304282 A1* 12/2011 Li ......................... A24F 47/008
                                                    315/362

(Continued)

FOREIGN PATENT DOCUMENTS

CN      202262413 U     6/2012
CN      202679020 U     1/2013
(Continued)

*Primary Examiner* — Stewart Fraser
(74) *Attorney, Agent, or Firm* — U.S. Fairsky LLP; Yue Xu

(57) ABSTRACT

A battery assembly for an electronic cigarette in which a battery assembly and an atomizer assembly are detachable may include two annular electrodes provided on a side surface of an end cover of the battery assembly. The two annular electrodes may be electrically connected to two electrodes of a battery in the battery assembly, and may be separated from each other by an insulating ring. An electronic cigarette may include an atomizer assembly and a battery assembly which share one outer cartridge. An end cover may be provided at an end of the outer cartridge located at the battery assembly. The electronic cigarette may further include two annular electrodes provided on a side surface of the end cover, and the two annular electrodes may be electrically connected to two electrodes of a battery in the battery assembly, and may be separated from each other by an insulating ring.

17 Claims, 6 Drawing Sheets

(51) Int. Cl.
*H01M 2/10* (2006.01)
*H02J 7/00* (2006.01)
(52) U.S. Cl.
CPC ....... *H02J 7/0044* (2013.01); *H01M 2220/30* (2013.01); *H02J 7/0063* (2013.01)

(56) References Cited

U.S. PATENT DOCUMENTS

| | | | | |
|---|---|---|---|---|
| 2013/0192618 A1* | 8/2013 | Li | ........................ | A24F 47/008 131/329 |
| 2014/0014124 A1* | 1/2014 | Glasberg | ............... | A24F 47/008 131/328 |
| 2016/0000148 A1* | 1/2016 | Liu | ....................... | A24F 47/008 131/329 |
| 2016/0360793 A1* | 12/2016 | Liu | ..................... | H01M 2/1055 |

FOREIGN PATENT DOCUMENTS

| | | |
|---|---|---|
| CN | 202890461 U | 4/2013 |
| WO | 2013/102612 A2 | 7/2013 |

\* cited by examiner

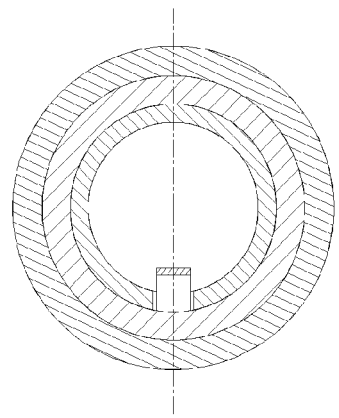
Fig. 11
Fig. 12
Fig. 13
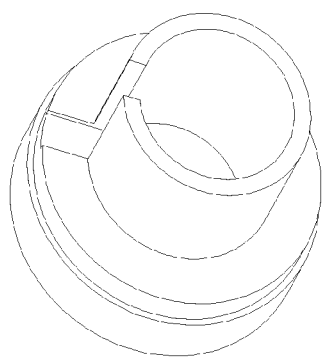 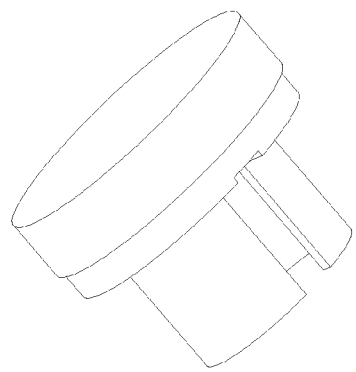
Fig. 14    Fig. 15

US 9,642,396 B2

ELECTRONIC CIGARETTE SET, ELECTRONIC CIGARETTE AND BATTERY ASSEMBLY THEREOF

This application is the US national phase of International Application No. PCT/CN2013/082975 filed on Sep. 5, 2013, which claims the benefit of priority to Chinese patent application No. 201320503567.1 titled "ELECTRONIC CIGARETTE SET, ELECTRONIC CIGARETTE AND BATTERY ASSEMBLY THEREOF" and filed with the Chinese State Intellectual Property Office on Aug. 16, 2013, the entire disclosure of which is incorporated herein by reference.

FIELD OF THE INVENTION

The present application relates to a technical field of electronic cigarettes, and in particular to an electronic cigarette suit, an electronic cigarette and a battery assembly thereof.

BACKGROUND OF THE INVENTION

A conventional electronic cigarette mainly includes two parts of a battery assembly and an atomizer assembly, as shown in FIG. 1. The part of the battery assembly includes an end cover 11, a microphone controller 12, a microphone seat 13, a battery 14, a battery cartridge 15, a spring electrode 16, an electrode fixing seat 17, and a connecting seat 18. The part of the atomizer assembly includes a connector 20, an upper electrode 21, an upper insulation ring 22, an atomizing seat 23, an electric heating wire 24, a PVC silicone fiberglass sleeve 25, liquid storage cotton 26, an atomizing cartridge 27, a seal ring 28, and a suction nozzle cover 29.

It can be seen that, a working electrode of the electronic cigarette is located at the connection area between the battery assembly and the atomizer assembly, and the working electrode also serves as a charging electrode. Thus, the atomizer assembly has to be dismounted before the battery assembly is charged. Such structure is inconvenient to be operated, and a poor contact with the electrode may be caused by frequent abrasion, which will bring a bad usage experience to users.

Hence, in view of the above fact, an important technical problem to be solved presently by those skilled in the art is to improve the structure of the electronic cigarette, such that the atomizer assembly needn't be dismounted while the battery assembly is charged, which is convenient in operation.

SUMMARY OF THE INVENTION

In view of this, there is provided in the present application a battery assembly, which may be charged without the need for dismounting the atomizer assembly. The battery assembly can be charged once it is directly inserted into a charger, which is more convenient to use and avoids a poor contact with the electrode caused by frequent disassembly and assembly.

There are also provided in the present application an electronic cigarette and an electronic cigarette set including the above battery assembly.

In order to achieve the above objects, following technical solutions are provided in the present application:

A battery assembly applicable to an electronic cigarette in which a battery assembly and an atomizer assembly are detachable includes two annular electrodes provided on the side surface of an end cover of the battery assembly. The two annular electrodes are electrically connected to two electrodes of a battery in the battery assembly respectively, and are separated from each other by an insulating ring.

Preferably, the two annular electrodes are a first annular electrode provided on an outside wall of the side surface of the end cover and a second annular electrode fastened in a battery cartridge of the battery assembly, respectively;

the insulating ring is provided on the outside wall of the side surface of the end cover, and has two end surfaces abutting against an end surface of the first annular electrode and an end surface of the second annular electrode respectively.

Preferably, the two annular electrodes are a first annular electrode provided on an outside wall of the side surface of the end cover and a second annular electrode provided in a battery cartridge of the battery assembly, respectively;

the insulating ring is provided in the second annular electrode, and one end surface of the insulating ring abuts against an end surface of the first annular electrode.

Preferably, an electrode connecting rod extending towards the center of the first annular electrode is provided in the first annular electrode, and extends through a corresponding notch in the end cover to be electrically connected to a microphone controller of the battery assembly, so as to realize the electrical connection with one electrode of the battery. The battery cartridge is made of metal conductive material, and the second annular electrode is electrically connected to the other electrode of the battery via the battery cartridge and a connecting seat of the battery assembly.

Preferably, the electrode connecting rod is provided from an inside wall of the first annular electrode in radial direction, and then is curved in axial direction, with a tail end of the electrode connecting rod being lapped jointed with a wire of the microphone controller.

Preferably, a step surface is provided on the outside wall of the side surface of the end cover, and is configured to press the first annular electrode, the insulating ring and the second annular electrode tightly in the radial direction and the axial direction.

An electronic cigarette includes an atomizer assembly and a battery assembly which share one outer cartridge. An end cover is provided at the end of the outer cartridge located at the battery assembly. The electronic cigarette further includes two annular electrodes provided on a side surface of the end cover. The two annular electrodes are electrically connected to two electrodes of a battery in the battery assembly respectively, and are separated from each other by an insulating ring.

An electronic cigarette set includes an electronic cigarette and a cigarette case, and the electronic cigarette includes the battery assembly described above.

Preferably, a PCB board and a charging seat provided on the PCB board are provided in the cigarette case. The charging seat is configured to be engaged with the two annular electrodes on the side surface of the end cover of the battery assembly of the electronic cigarette, and the cigarette case is configured to serve as a charger for the electronic cigarette.

Preferably, the charging seat includes two charging elastic sheets configured to be engaged with the two annular electrodes respectively.

It can be seen from the above technical solutions that, in the battery assembly according to the embodiment of the present application, since the annular electrodes are provided directly on the side surface of the end cover and serves as charging electrodes, there is unnecessary to dismount the atomizer assembly while the battery assembly is charged; and the battery assembly can be charged once it is directly inserted into a charger, which is more convenient to use and avoids a poor contact with the electrode caused by frequent disassembly and assembly. On the other hand, by using two side rings at the end cover as conductive electrodes, the appearance and shape of the existing end cover will be left intact. The electronic cigarette set in the present application is convenient and useful.

BRIEF DESCRIPTION OF THE DRAWINGS

In order to more clearly illustrate embodiments of the present application or technical solutions in the prior art, drawings required for the description of the embodiments or the prior art will be briefly introduced below. Apparently, the drawings described below simply relate to some embodiments of the present application, and those skilled in the art may obtain other drawings, based on the following drawings, without any creative work.

FIG. 11 is a sectional view taken along line B-B of FIG. 10;

FIG. 12 is a overall view of the electronic cigarette according to the second embodiment of the present application;

FIG. 13 is a exploded view of the electronic cigarette according to the second embodiment of the present application;

FIG. 14 is a structural schematic view of an end cover according to an second embodiment of the present application; and FIG. 15 is a structural schematic view of the end cover according to the second embodiment of the present application.

REFERENCE NUMERALS IN THE DRAWINGS

Figure 1:
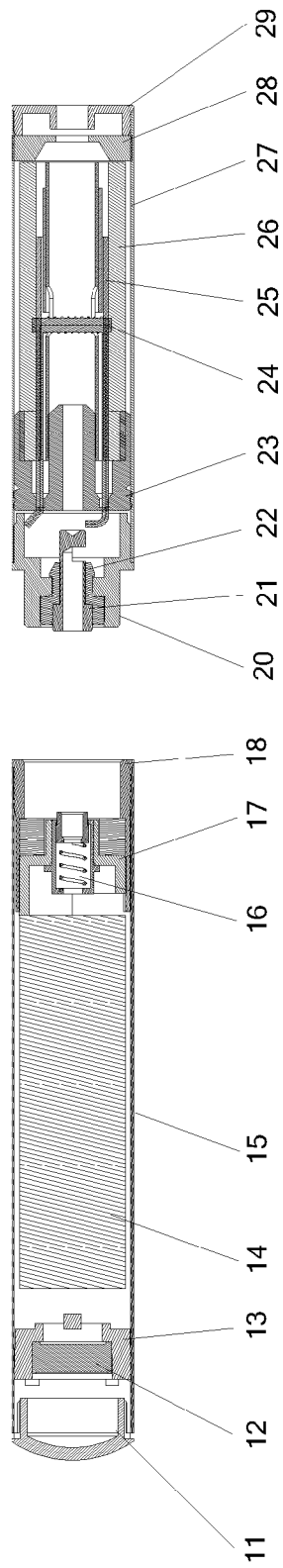
FIG. 1 is a structural schematic view of an electronic cigarette in the prior art.

11 end cover, 12 microphone controller, 13 microphone seat, 14 battery, 15 battery cartridge, 16 spring electrode, 17 electrode fixing seat, 18 connecting seat, 20 connector, 21 upper electrode, 22 upper insulation ring, 23 atomizing seat, 24 electric heating wire, 25 PVC silicone fiberglass sleeve, 26 liquid storage cotton, 27 atomizing cartridge, 28 seal ring, 29 suction nozzle cover; 31 end cover, 32 first annular electrode, 33 insulating ring, 34 second annular electrode, 4 electronic cigarette, 5 cigarette case, 51 PCB board, and 52 charging elastic sheet.

DETAILED DESCRIPTION

There are provided in the present application an electronic cigarette set, an electronic cigarette and a battery assembly thereof. There is unnecessary to dismount the atomizer assembly while the battery assembly is charged, and the battery assembly can be charged once it is directly inserted into a charger, which is more convenient to use and avoids a poor contact with the electrode caused by frequent disassembly and assembly. The application is especially useful to a driver driving a car or the like who can operate the electronic cigarette only with one hand.

Hereinafter, in conjunction with the drawings in embodiments of the present application, technical solutions in embodiments of the present application will be described clearly and completely. Apparently, the embodiments described below are simply a part of, not all of embodiments of the present application. Base on the embodiments herein, other embodiments obtained by those skilled in the art without any creative work are also deemed to fall within the protection scope of the present application.

Referring to FIGS. 2 to 15, FIGS. 2 to 9 are views of an electronic cigarette according to the first embodiment of the present application; and FIGS. 10 to 15 are views of an electronic cigarette according to the second embodiment of the present application.

The battery assembly according to an embodiment of the present application could be applied not only in an electronic cigarette in which a battery assembly and an atomizer assembly can be detachable, but also in an electronic cigarette in which the battery assembly and the atomizer assembly are fixedly connected together, that is, the electronic cigarette in which the battery assembly and the atomizer assembly share one outer cartridge. An important improvement of the battery assembly is in that, it includes two annular electrodes provided on the side surface of an end cover 31 of the battery assembly. Here, the side surface of the end cover 31 is defined with reference to the end surface thereof. The two annular electrodes are electrically connected to two electrodes of a battery 14 in the battery assembly respectively, and are separated from each other by an insulating ring 33.

It can be seen from the above technical solution that, in the battery assembly according to the embodiment of the present application, since the annular electrodes are provided directly on the side surface of the end cover 31 and serves as charging electrodes, there is unnecessary to dismount the atomizer assembly while the battery assembly is charged; and the battery assembly can be charged once it is directly inserted into a charger, which is more convenient to use and avoids a poor contact with the electrode caused by frequent disassembly and assembly. On the other hand, by using two side rings at the end cover 31 as conductive electrodes, the appearance and shape of the existing end cover 31 can be retained.

In the first embodiment of the present application, the above two annular electrodes are a first annular electrode 32 provided on the outside wall of the side surface of the end cover 31, and a second annular electrode 34 fastened in a battery cartridge 15 of the battery assembly.

Figure 2:
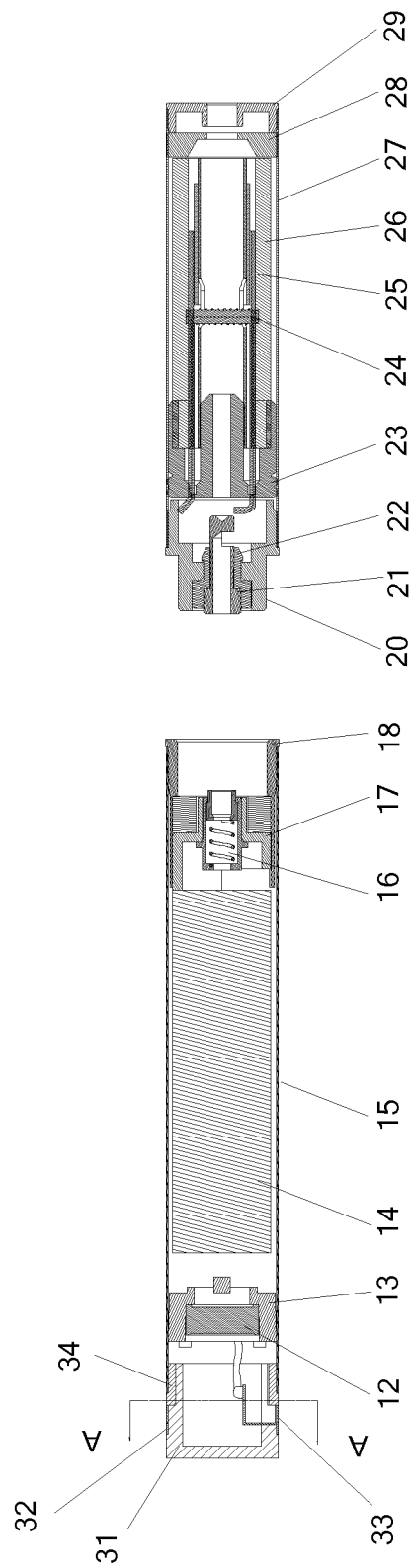
FIG. 2 is a structural schematic view of an electronic cigarette according to a first embodiment of the present application.
Figure 3:
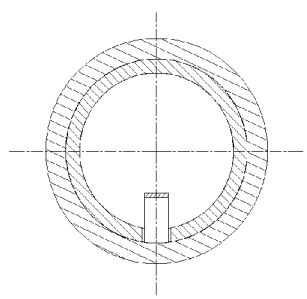
FIG. 3 is a sectional view taken along line A-A of FIG. 2.
Figure 4:
FIG. 4 is a overall view of the electronic cigarette according to the first embodiment of the present application.
Figure 5:
FIG. 5 is a exploded view of the electronic cigarette according to the first embodiment of the present application.
Figure 6:
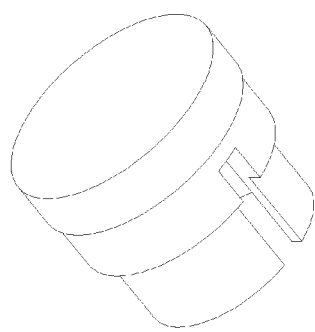
FIG. 6 is a structural schematic view of an end cover according to a first embodiment of the present application.
Figure 7:
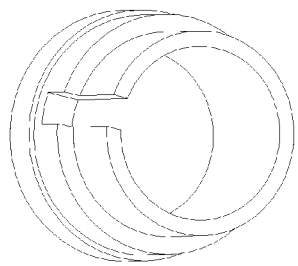
FIG. 7 is a structural schematic view of the end cover according to the first embodiment of the present application.

The insulating ring 33 is provided on the outside wall of the side surface of the end cover 31, and the end surfaces of the insulating ring 33 on two sides respectively abut against an end surface of the first annular electrode 32 and an end surface of the second annular electrode 34, as shown in FIG. 2. In order to fit in a charging seat conveniently, preferably, the end surface of the end cover 31 is modified from a conventional cambered surface into a flat surface.

When assembling, the second annular electrode 34 is inserted in the battery cartridge 15, and fastened by the battery cartridge 15; the first annular electrode 32 is placed on the end cover 31, and then the insulating ring 33 is placed on the end cover 31; and the end cover 31 is inserted into the second annular electrode 34 so as to form two side rings. Thus, it is possible to charge an electronic cigarette by directly inserting the electronic cigarette into the corresponding charger.

In the second embodiment of the present application, the above two annular electrodes are a first annular electrode 32 provided on the outside wall of the side surface of the end cover 31, and a second annular electrode 34 provided in a battery cartridge of the battery assembly.

The insulating ring 33 is provided in the second annular electrode 34, and an end surface of the insulating ring 33 on one side abuts against an end surface of the first annular electrode 32.

When assembling, the second annular electrode 34 is inserted in the battery cartridge 15, and the insulating ring 33 is inserted into the second annular electrode 34, and the first annular electrode 32 is provided on the end cover 31, and the end cover 31 is inserted in the insulating ring 33, and the first annular electrode 32 is compressed tightly by the end cover 31 and the insulating ring 33. In such a way, the electrodes can be fixed stably and reliably, and a poor contact with the electrode can be avoided effectively.

Preferably, an electrode connecting rod extending towards the center of the first annular electrode is provided in the first annular electrode 32, and can pass through a corresponding notch in the end cover 31 so as to be electrically connected with the microphone controller 12 of the battery assembly, thereby realizing the electrical connection with one electrode of the battery 14. The battery cartridge 15 is made of metal conductive material. The second annular electrode 34 is electrically connected to the other electrode of the battery 14 via the battery cartridge 15 and a connecting seat 18 of the battery assembly. The structure of the notch in the end cover 31 is as shown in FIGS. 6, 7, 14 and 15.

Specifically, the electrode connecting rod is provided from the inside wall of the first annular electrode 32 in radial direction, and then curves in axial direction, such that the electrode connecting rod appears in L-shape as a whole, with the tail end thereof being lapped-jointed with a wire of the microphone controller 12, as shown in FIGS. 2 to 5 and 10 to 13.

In order to further optimize the above technical solution, a step surface is provided on the outside wall of the side surface of the end cover 31, so as to press the first annular electrode 32, the insulating ring 33, and the second annular electrode 34 tightly in the radial direction and the axial direction.

It is appreciated in another embodiment that the two annular electrodes are two annular electroplated coatings plated on the side surface of the end cover by way of electroplating, and then the electroplated coatings and two electrodes of the battery are connected with leads by welding. The end cover is a lamp cap provided on the outer side of a head lamp which is used to emulate cigarette ash.

The charging structure in the present solution differs from the above dismountable structure (that is, the two assembly have respective cartridges, and then are connected together) in that it may also be used to a one-piece electronic cigarette, which includes an atomizer assembly and a battery assembly sharing one outer cartridge. An end cover is provided on the end of the outer cartridge located at the battery assembly. An important improvement is in that, two annular electrodes provided on the side surface of the end cover are further included, and are electrically connected to two electrodes of a battery in the battery assembly respectively, and are separated from each other by an insulating ring. There is further provided in an embodiment of the present application an electronic cigarette set, including an electronic cigarette 4 and a cigarette case 5. An important improvement is in that: the electronic cigarette 4 has the above battery assembly. Accordingly, there is unnecessary to dismount the atomizer assembly while the battery assembly is charged; and the battery assembly can be charged once it is directly inserted into a charger, which is more convenient to use and avoids a poor contact with the electrode caused by frequent disassembly and assembly.

In a preferred embodiment of the present solution, a PCB board 51 (printed circuit board) and a charging seat provided on the PCB board 51 are provided in the cigarette case, and the charging seat is configured to be engaged with the two annular electrodes on the side surface of the end cover of the battery assembly of the electronic cigarette 4. Thus, the cigarette case 5 could be used as a charger for the electronic cigarette 4.

In order to further optimize the above technical solution, a slot fitted with the electronic cigarette 4 is provided in the cigarette case 5, and the above charging seat is located at the bottom of the slot. As such, when the electronic cigarette 4 is placed back into the cigarette case 5, the annular electrodes provided at the end cover could be engaged with the charging seat to perform charging.

Figure 8:
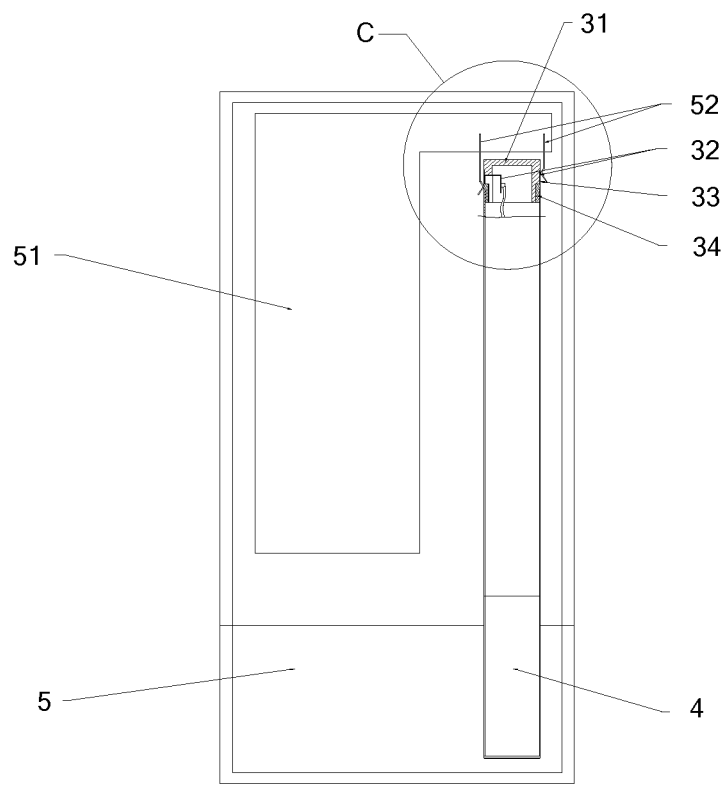
FIG. 8 is a schematic view of the electronic cigarette according to the first embodiment of the present application in charging.
Figure 9:
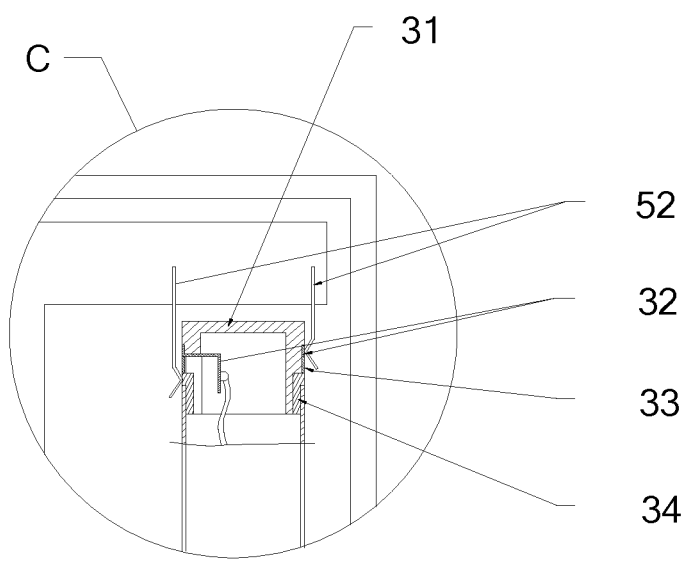
FIG. 9 is an enlarged structural schematic view of a C area of FIG. 8.
Figure 10:
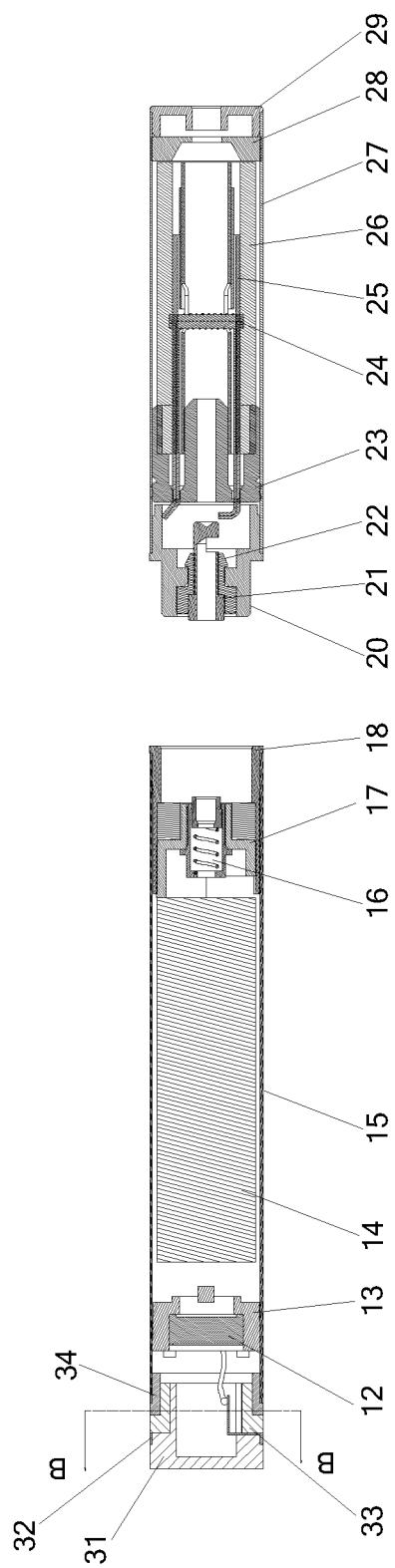
FIG. 10 is a structural schematic view of an electronic cigarette according to a second embodiment of the present application.

Specifically, the charging seat includes two charging elastic sheets 52 used to be engaged with the two annular electrodes respectively. The charging contacts of the two elastic sheets are staggered vertically, as shown in FIGS. 8 and 9.

In summary, in the electronic cigarette and charging structure thereof provided in the embodiments of the present application, by directly providing the annular electrodes on the side surface of the end cover as charging electrodes, there is unnecessary to dismount the atomizer assembly while the battery assembly is charged; and the battery assembly can be charged once it is directly inserted into a charger, which is more convenient to use and avoids a poor contact with the electrode caused by frequent disassembly and assembly. On the other hand, by using two side rings at the end cover as conductive electrodes, the appearance and shape of the existing end cover will be left intact. The electronic cigarette set in the present application is convenient and useful.

The embodiments of the present application have been described in a progressive manner, and every embodiment focuses on illustrating differences from one another. Identical and similar parts between the embodiments may be referred to mutually.

The foregoing description of the embodiments disclosed enables those skilled in the art to implement or use the present application. Various modifications to these embodiments may be apparent to those skilled in the art, and the general principle defined in the present application could be implemented in other embodiments without departing from the spirit or the scope of the present application. Therefore, the present application will not be limited to the embodi-

What is claimed is:

1. A battery assembly applicable to an electronic cigarette in which a battery assembly and an atomizer assembly are detachable, comprising two annular electrodes provided on a side surface of an end cover of the battery assembly, wherein the two annular electrodes are electrically connected to two electrodes of a battery in the battery assembly respectively, and are separated from each other by an insulating ring.

2. The battery assembly according to claim 1, wherein the two annular electrodes are a first annular electrode provided on an outside wall of the side surface of the end cover and a second annular electrode fastened in a battery cartridge of the battery assembly, respectively;
the insulating ring is provided on the outside wall of the side surface of the end cover, and has two end surfaces abutting against an end surface of the first annular electrode and an end surface of the second annular electrode respectively.

3. The battery assembly according to claim 2, wherein an electrode connecting rod extending towards the center of the first annular electrode is provided in the first annular electrode, and extends through a corresponding notch in the end cover to be electrically connected to a microphone controller of the battery assembly, so as to realize the electrical connection with one electrode of the battery; the battery cartridge is made of metal conductive material, and the second annular electrode is electrically connected to the other electrode of the battery via the battery cartridge and a connecting seat of the battery assembly.

4. The battery assembly according to claim 3, wherein the electrode connecting rod is provided from an inside wall of the first annular electrode in radial direction, and then is curved in axial direction, with a tail end of the electrode connecting rod being lapped-jointed with a wire of the microphone controller.

5. The battery assembly according to claim 4, wherein a step surface is provided on the outside wall of the side surface of the end cover, and is configured to press the first annular electrode, the insulating ring, and the second annular electrode tightly in the radial direction and the axial direction.

6. The battery assembly according to claim 1, wherein the two annular electrodes are a first annular electrode provided on an outside wall of the side surface of the end cover and a second annular electrode provided in a battery cartridge of the battery assembly, respectively;
the insulating ring is provided in the second annular electrode, and one end surface of the insulating ring abuts against an end surface of the first annular electrode.

7. The battery assembly according to claim 6, wherein an electrode connecting rod extending towards the center of the first annular electrode is provided in the first annular electrode, and extends through a corresponding notch in the end cover to be electrically connected to a microphone controller of the battery assembly, so as to realize the electrical connection with one electrode of the battery; the battery cartridge is made of metal conductive material, and the second annular electrode is electrically connected to the other electrode of the battery via the battery cartridge and a connecting seat of the battery assembly.

8. The battery assembly according to claim 7, wherein the electrode connecting rod is provided from an inside wall of the first annular electrode in radial direction, and then is curved in axial direction, with a tail end of the electrode connecting rod being lapped-jointed with a wire of the microphone controller.

9. The battery assembly according to claim 8, wherein a step surface is provided on the outside wall of the side surface of the end cover, and is configured to press the first annular electrode, the insulating ring, and the second annular electrode tightly in the radial direction and the axial direction.

10. An electronic cigarette set, comprising an electronic cigarette and a cigarette case, wherein the electronic cigarette comprises the battery assembly according to claim 1.

11. The electronic cigarette set according to claim 10, wherein a PCB board and a charging seat provided on the PCB board are provided in the cigarette case, the charging seat is configured to be engaged with the two annular electrodes on the side surface of the end cover of the battery assembly of the electronic cigarette, and the cigarette case is configured to serve as a charger for the electronic cigarette.

12. The electronic cigarette set according to claim 11, wherein the charging seat comprises two charging elastic sheets configured to be engaged with the two annular electrodes respectively.

13. The electronic cigarette set according to claim 10, wherein the two annular electrodes are a first annular electrode provided on an outside wall of the side surface of the end cover and a second annular electrode fastened in a battery cartridge of the battery assembly, respectively;
the insulating ring is provided on the outside wall of the side surface of the end cover, and has two end surfaces abutting against an end surface of the first annular electrode and an end surface of the second annular electrode respectively.

14. The electronic cigarette set according to claim 10, wherein the two annular electrodes are a first annular electrode provided on an outside wall of the side surface of the end cover and a second annular electrode provided in a battery cartridge of the battery assembly, respectively;
the insulating ring is provided in the second annular electrode, and one end surface of the insulating ring abuts against an end surface of the first annular electrode.

15. The electronic cigarette set according to claim 14, wherein an electrode connecting rod extending towards the center of the first annular electrode is provided in the first annular electrode, and extends through a corresponding notch in the end cover to be electrically connected to a microphone controller of the battery assembly, so as to realize the electrical connection with one electrode of the battery; the battery cartridge is made of metal conductive material, and the second annular electrode is electrically connected to the other electrode of the battery via the battery cartridge and a connecting seat of the battery assembly.

16. The electronic cigarette set according to claim 13, wherein an electrode connecting rod extending towards the center of the first annular electrode is provided in the first annular electrode, and extends through a corresponding notch in the end cover to be electrically connected to a microphone controller of the battery assembly, so as to realize the electrical connection with one electrode of the battery; the battery cartridge is made of metal conductive material, and the second annular electrode is electrically connected to the other electrode of the battery via the battery cartridge and a connecting seat of the battery assembly.

17. An electronic cigarette, comprising an atomizer assembly and a battery assembly which share one outer cartridge, wherein an end cover is provided at an end of the outer cartridge located at the battery assembly, the electronic cigarette further comprises two annular electrodes provided on a side surface of the end cover, and the two annular electrodes are electrically connected to two electrodes of a battery in the battery assembly respectively, and are separated from each other by an insulating ring.

* * * * *